United States Patent [19]
Schubert

[11] 3,888,029
[45] June 10, 1975

[54] CHANGEABLE MULTIPLE IMAGE DISPLAY APPARATUS

[75] Inventor: Wilfried Schubert, Bensenville, Ill.

[73] Assignee: National Advertising Company, Bedford Park, Ill.

[22] Filed: Feb. 1, 1974

[21] Appl. No.: 438,742

Related U.S. Application Data

[62] Division of Ser. No. 294,791, Oct. 4, 1972, Pat. No. 3,824,726.

[52] U.S. Cl.......... 40/125 G; 40/125 R; 160/368 R; 160/371
[51] Int. Cl............................................. G09f 13/04
[58] Field of Search .. 40/125 G, 128, 125 F, 125 R, 40/125 K, 152, 132 R, 156, 152.2, 160, 106.1; 160/368 R, 371, 378

[56] References Cited
UNITED STATES PATENTS

| | | | |
|---|---|---|---|
| 1,781,277 | 11/1930 | Gammeter | 40/128 |
| 2,189,521 | 2/1940 | King | 40/152 |
| 2,305,426 | 12/1942 | Howell | 40/128 UX |
| 2,722,420 | 11/1955 | Adamson | 40/125 G UX |
| 3,384,148 | 5/1968 | Sarginson et al. | 160/378 X |
| 3,460,282 | 8/1969 | Swirsky | 40/152 X |
| 3,502,316 | 3/1970 | Saether | 160/385 X |

*Primary Examiner*—Robert W. Michell
*Assistant Examiner*—John F. Pitrelli
*Attorney, Agent, or Firm*—Merriam, Marshall, Shapiro & Klose

[57] ABSTRACT

An improved removable display film carrier for changeable copyboards including a carrier panel frame with a display surface, means for removably mounting the frame onto changeable copyboards, a flexible display film bearing an image on at least one face, and a plurality of elastomeric tensioning members, each tensioning member having one end attachable to a panel frame corner, another end attachable to the flexible film corner, and a stretchable middle portion, the flexible display film being held under constant tension on the carrier frame, centered on and slightly spaced from the inside display surface. The display film can be readily changed and replaced as desired to correlate with a worded message. A three-in-one display including a supporting structure, a light diffusion plate having a background image mounted rearwardly in the supporting structure, a changeable display film mounted in a carrier frame and in front of the diffusion plate, the display film bearing an image which is compatible for display purposes when viewing the diffusion plate image overlaid by the display film image, elastomeric tensioning members for mounting the display film in constant tension suspension within the carrier frame, and a changeable copyboard mounted to the front side of the carrier frame. The three-in-one display can accommodate a smaller display film carrier panel removably mounted on the changeable copyboard to provide a four-in-one display.

8 Claims, 8 Drawing Figures

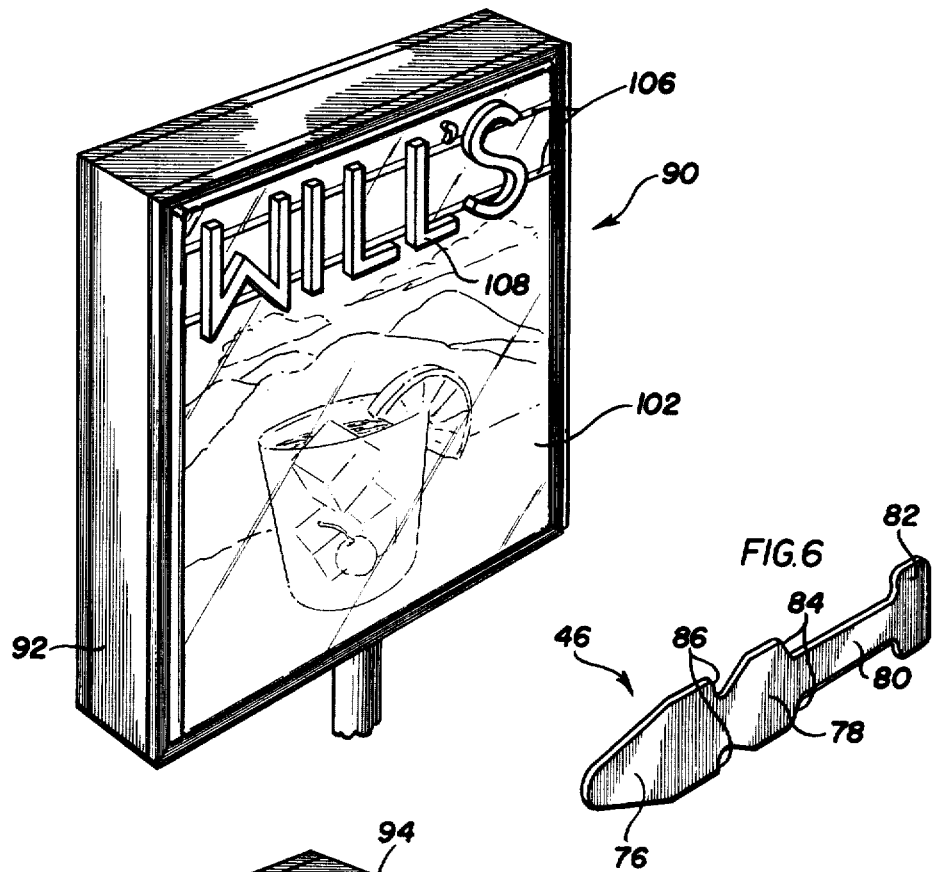
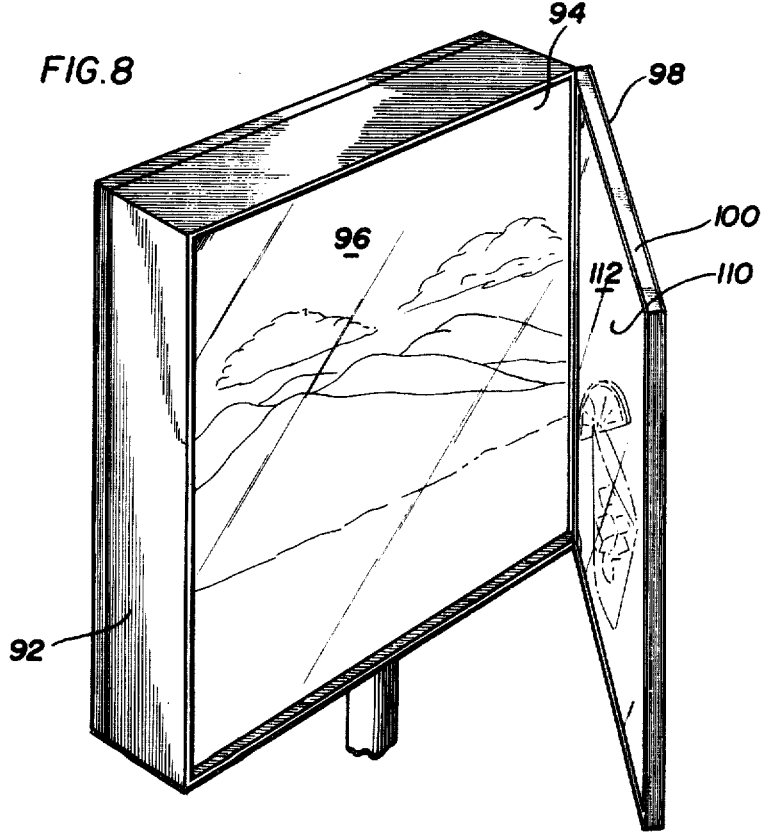

CHANGEABLE MULTIPLE IMAGE DISPLAY APPARATUS

This is a division of application Ser. No. 294,791, Filed Oct. 4, 1972 now U.S. Pat. No. 3,824,126.

This invention relates to display apparatus and in particular to such apparatus having multiple image display members including changeable pictorial displays.

Conventional copyboards or displays containing changeable characters are often used outdoor at various establishments such as theaters, hotels, restaurants, supermarkets, etc. Such copyboards normally include a number of parallel, horizontal hanger bars or tracks mounted in spacially separated, vertical positions on the copyboard and with the individual changeable characters normally detachably mounted between two adjacent hanger bars. Recently, it has been desirable to mount other indicia bearing display members, such as removable panels containing pictorial displays onto the standard hanger bars forming the copyboard background. Such a changeable copyboard with a pictorial display panel is described in a co-pending application of Wilfried Schubert, U.S. Ser. No. 220,868, assigned to the same assignee here. In the aforementioned application, the display panel includes a graphic or pictorial illustration on a sheet or film of thin, flexible film material, such as polyester, taped or cemented around its perimeter to the inside display surface of a rigid, transparent carrier panel. The carrier panel is usually formed of a clear, hard plastic material suitable for outdoor use. Such a removable carrier panel also could be made of aluminum or other lightweight metal forming a picture frame type panel around a transparent display surface. Novel means are disclosed in the aforementioned application for detachably mounting the carrier panel on most of the conventional copyboards.

It has been found that cementing or otherwise rigidly attaching the pictorial film to the carrier panel display surface becomes impractical due to the difference in expansion and contraction coefficients between the flexible polyester material used for the film and the hard plastic material used for the entire carrier panel or at least the display surface. The carrier panel display surface will normally expand or contract approximately ⅛ inch per foot. However, the polyester film material used for the pictorial sheet has practically no expansion or contraction, and therefore when rigidly cemented to the carrier panel display surface the sheet is either buckled or stretched under changing environmental conditions, resulting in distortion of the graphic illustration on its face. Cementing the film to the transparent carrier face also traps moisture between the film and the inside carrier surface and develops a clouding or otherwise obscuring of the graphic illustration. The use of small metal springs or clips for mounting the display film to the panel is undesirable due to corrosion and display distraction.

Such problems have generally inhibited prior attempts at providing both small and large pictorial displays which could for instance be used as a background on a changeable copyboard display for the normal worded message provided by the changeable characters.

SUMMARY OF THE INVENTION

In accordance with one aspect of the invention, there is provided novel means for detachably fastening a thin film bearing a display image to a carrier frame in such a manner as to be adaptable to either relatively small or large displays without the attendant problems of prior art attempts. In particular, the novel fastening means include a plurality of translucent elastomeric tensioning devices each detachably mounted on at least a corner of a carrier frame for readily fastening the thin, display sheet to the carrier in such a manner as to maintain the display sheet under constant tension and thereby avoid the distortion and moisture problems of the prior art. In addition, the novel fastening means provide for relative ease in changing the display sheet to display another image as desired and do not distract one's attention from the featured display. In one embodiment of the invention, a display sheet carrier frame can be removably mounted on existing changeable copyboards so as to supplement the normal worded message on such copyboards with graphic and realistic pictorial subjects depicted on the display sheet and provide a desirable feature of relative ease in changing the display image as desired. In another embodiment of the invention, there is provided a three-in-one display including: (1) a light diffusion plate with a semi-permanent background image useful for instance for all seasons of the year; (2) a changeable display film mounted to overlay the diffusion plate image, the display film being readily changeable with each season and mounted with the novel fastening members on a transparent carrier frame; and (3) hanger bars mounted on the carrier frame for supporting changeable characters bearing a worded message. Alternatively, a four-in-one display, can be provided by mounting the removable display sheet carrier frame on the hanger bars.

BRIEF DESCRIPTION OF THE DRAWINGS

FIG. 6 is a perspective view illustrating the preferred embodiment of a double headed tensioning device;

FIG. 7 is a perspective view of a multiple display structure incorporating the principles of the present invention and incorporating a diffusion panel with a display image, a pictorial film display, and changeable characters mountable on hanger bars; and FIG. 8 is an illustration of the multiple display structure of FIG. 7 with the pictorial film and changeable characters mounted on a hinged portion of the display frame structure.

DETAILED DESCRIPTION

Figure 1:
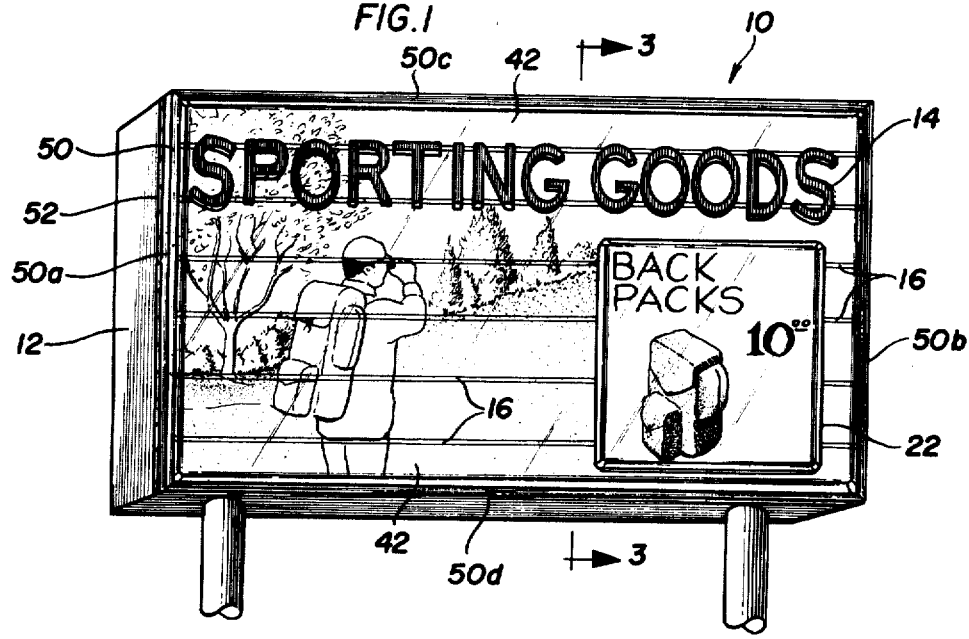
FIG. 1 is a perspective view of a multiple image display apparatus incorporating changeable pictorial display films in a hinged display framework.
Figure 2:
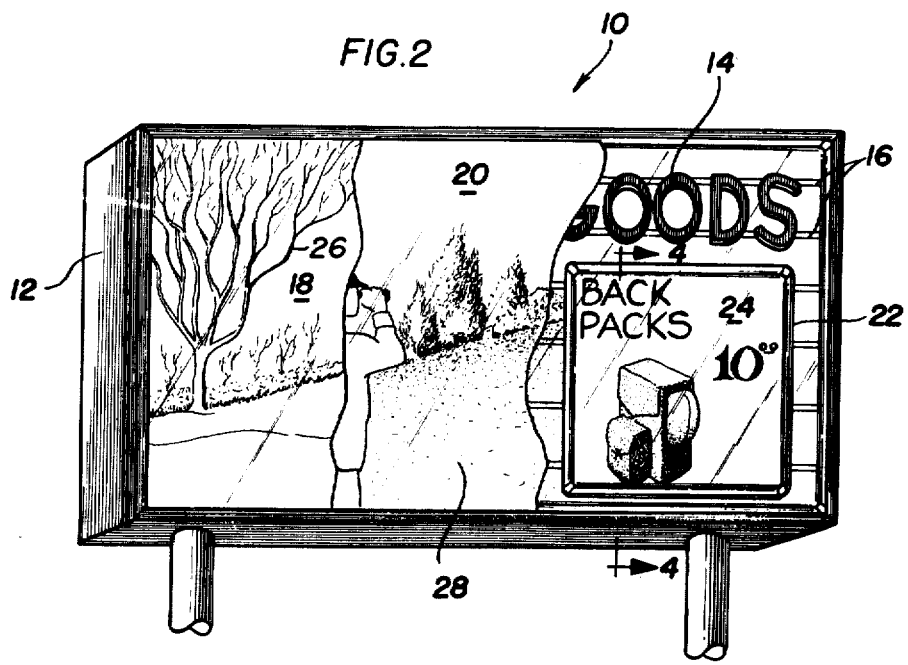
FIG. 2 is a partially cut-away view illustrating up to three changeable images in the novel display apparatus of FIG. 1.

Referring now to FIGS. 1–6, there is illustrated a changeable multiple image display 10 supported by a framework structure 12. As shown in FIG. 1, the display 10 appears as a standard changeable copyboard having a worded message presented by the changeable characters 14 which are mounted on hanger bars 16. The changeable characters 14 and hanger bars 16 are standard components well known in the industry. However, in addition to the normal worded message, there is also provided in the display 10 a graphic or pictorial showing of a background image in accordance with the present invention. As illustrated in FIG. 2, the background image is formed of a semi-permanent initial background 18 overlayed on the display face by a changeable background display 20. The display system 10 further includes a removable carrier frame 22 within which is mounted a changeable pictorial display 24.

As will be described in more detail hereinafter, the image background 20, the highlight or feature image 24 and the characters 14 can be readily changed. Thus, the display 10 provides extreme flexibility in changing and adjusting the display as desired. As an example, in the illustrations of FIGS. 1 and 2, the basic background image 18 includes an image of a bare tree 26 and bare earth and sky. The changeable background 20 depicts a seasonal image in which the bare tree 26 when overlayed with the image 20 appears as in FIG. 1 to have foliage. Similarly, the ground cover 28 on image 20, when overlayed on the image 18, appears as shown in FIG. 1 as a seasonable ground cover. A particularly featured item might also be highlighted with the pictorial image 24 on the removable transparent carrier frame 22.

Thus, the display 10 provides a highly flexible and changeable on-premise, indoor or outdoor graphic advertising display with a permanent appearance and yet readily adaptable for conversion to meet changing promotional campaigns as desired.

Reference may be made to FIGS. 3–6 in which there is illustrated the construction details for the display 10 of the present invention. In particular, the initial background image 18 is provided on a translucent plastic panel or plate 30 with the background image 18 being screened, for example, onto one surface thereof. The plate 30 is preferably frosted or othewise provided with light diffusion properties. A lamp assembly 32 is mounted to the metal framework 12 so as to illuminate each display face in the double display face embodiment shown in FIG. 3.

Figure 3:
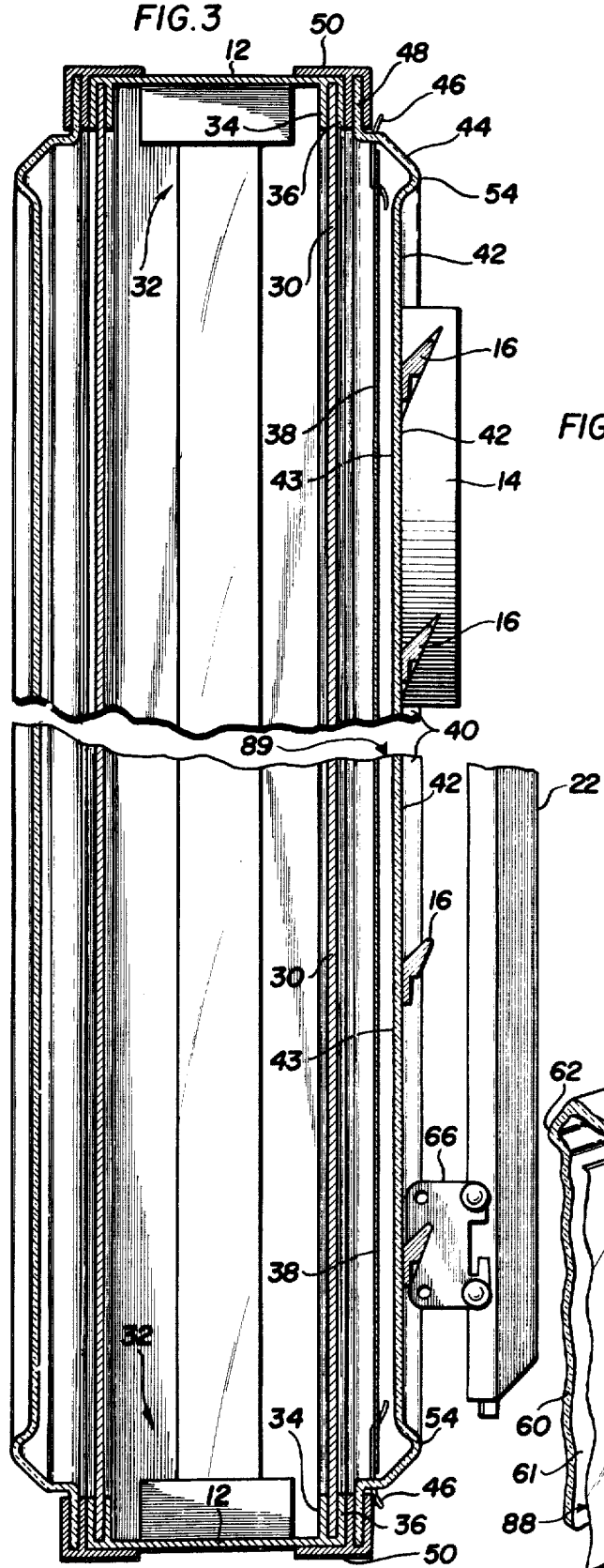
FIG. 3 is a sectional view taken along sectional lines 3—3 of FIG. 1 and illustrating a double sided display system, each side having a diffusion plate, a pictorial film, changeable characters mounted on hanger bars, and a pictorial film carrier removably mounted on the hanger bars.

As shown in the sectional view of FIG. 3, the metal framework 12 includes on each side and around the perimeter of the display face a channel formed between a pair of depending legs 34, 36 with the plastic diffusion plate 30 semi-permanently mounted therein.

The changeable background image 20 is provided by a thin, image bearing sheet or display film 38 detachably fastened in a rigid transparent plastic carrier frame 40. The display film 38 can for instance be formed of polyester film with the subject image 20 screened thereon. Other flexible film materials can also be utilized. The carrier frame 40 includes a transparent surface 42 upon which the hanger bars 16 are mounted, as by cementing. The carrier 40 further includes a flange portion 44 around the perimeter of the carrier 40 for mounting the changeable display film 38. A plurality of elastomeric tensioning devices 46 pass through suitable apertures in the flange 44 and in the display sheet 38 so as to suspend the display sheet 38 inside the carrier frame 44 under constant tension. One embodiment of an elastomeric tensioning device is illustrated in FIG. 6 and will be described in more detail hereinafter.

A return flange 48 extends from flange 44 for semi-permanent mounting of the carrier frame 40 on the framework 12. In particular, a rectangular channel frame 50 includes a channel within which is mounted the return flange 48. The channel frame 50 includes at one side 50a thereof a piano type hinge 52 which is rigidly attached to the metal framework 12 such that the channel frame 50 supporting the carrier 40 and display film 38 can be pivoted on the piano hinge 52 away from the display framework 12. Thus, when it is desired to change the display film 38, the channel frame side 50b (see FIG. 1) can be grasped and the channel frame 50 pivotally swung away from the display frame 12. Instead of a side hinge 52, either a top or bottom hinge can of course be provided as desired. The elastomeric tensioning devices 46 can then be freed from the display film 38 and a new display film with the desired image can be mounted in carrier 40 and the channel frame 50 pivoted back on the piano hinge 52 so as to again engage the frame 12 in a locking position. It is to be understood that the above description is given to illustrate the construction details for one display side of the display 10. In the embodiment shown in FIG. 3, there are actually two display sides, it being understood that the construction of both sides of the display being the same.

As indicated previously, the hanger bars 16 are cemented on the outer surface 42 of the carrier frame 40. The hanger bars 16 can accommodate a number of changeable characters 14 each having slots which coincide with the angled portions of the hanger bars for suspension thereon. The hanger bars and changeable characters are, of course, standard components utilized in changeable copyboard displays. However, in the present novel display 10, the carrier frame 40 must be formed of a relatively light weight transparent material so that the carrier can be readily supported by the hinge 52 during changing of the display image 38. On the other hand, the carrier also must be rigid enough to support the hanger bars 16 and a full compliment of changeable characters. In order to solve this apparently diverse problem, the carrier frame is provided with a reinforcing rib 54 around the perimeter of the carrier 40, providing a reinforced interconnection between the display surface 42 and the flange portions 44 and 48. The rib 54 reinforces the carrier 40 such that a light weight plastic material can be utilized and yet the carrier will have the necessary load carrying ability to support the hanger bars and a number of changeable characters thereon, even when the carrier is supported only by the small channel frame 50 in the opened position.

Figure 4:
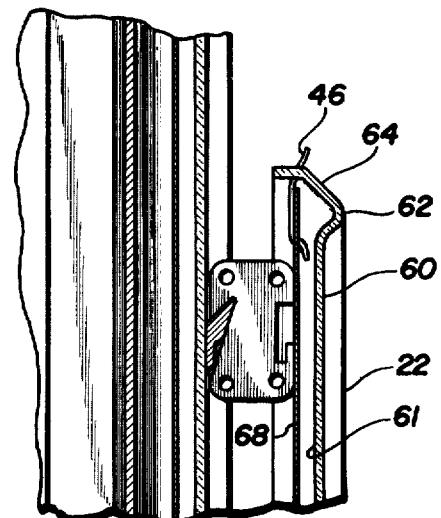
FIG. 4 is a sectional view taken along line 4—4 of FIG. 2 illustrating the details of the removable carrier with a suspended pictorial film mounted therein under constant tension.
Figure 5:
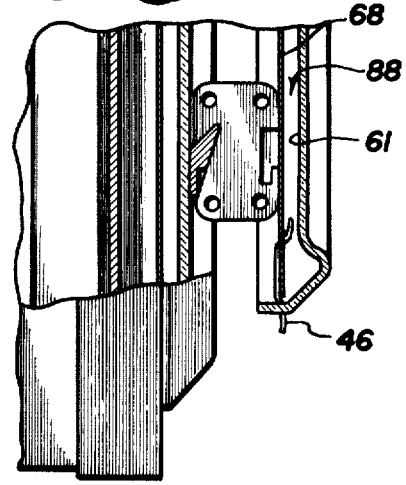
FIG. 5 is a fragmented view of one corner of the removable carrier frame illustrating the novel fastening means including a tensioning device for mounting the display film on the carrier frame.

The changeable feature image 24 contained within the removable carrier 22 is illustrated in FIGS. 3–6. The removable carrier frame 22 includes a transparent display face 60, a reinforcing rib 62, and a flange 64 similar to like components for the carrier 40. As can be seen by comparing the removable carrier frame 22 with the semi-permanently mounted carrier frame 40, the details of construction are similar except that rather than a channel mounting flange 48, the carrier 22 includes means for mounting the carrier on any conventional hanger bar background. Mounting of the carrier 22 on the hanger bars can be provided by the reversible mounting brackets 66 which are described in detail in the aforementioned co-pending application. For purposes of illustrating the present invention, it need only be indicated here that the reversible brackets 66 are mountable to the flange 64 as shown in FIG. 5 so that the carrier 22 then can be suspended on the hanger bars 16.

However, to eliminate the previously indicated distortion and moisture problems arising in prior display film carriers, a display film 68 is fastened to the carrier 22 by novel fastening means including a number of the elastomeric tensioning members 46 located preferably at least at each corner of the carrier frame as shown in FIG. 5. The details of construction and the interconnections between the display sheet 68, the elastomeric tensioning members 46 and the flange 64 is virtually identical to that for the display film 38, tensioning member 46, and flange 44. This novel fastening means between the display film and the carrier will be described in connection with the carrier 22, it being understood that the same description is applicable to the like components for the carrier frame 40.

As shown in FIG. 5, at each corner of the display film 68 there is provided a double faced corner reinforcement 70 formed of a thin polyester material, folded and applied to each corner with a pressure-heat activated resin. An aperture 72 is provided through the corner reinforcement 70 and the display film 68. A suitable aperture is also provided on the angled anchor portion 74 of flange 64, at each corner of frame 22. The tensioning member 46 shown in FIG. 6 is formed of an elastomeric, translucent material and includes a double headed front portion 76, 78, a middle portion 80, and a tail 82. As can be seen from FIG. 6, the double headed portions 76 and 78 and the tail 82 are all somewhat larger than the middle portion 80. In use, respective tensioning members 46 are inserted through respective apertures in the flange anchor portion 74 until only the tail portion 82 remains anchored on the exterior of the flange. The double heads 76, 78 are then inserted through respective apertures 72, stretching middle portion 80 so when released, the larger head portion 84 of each tensioning member is firmly in contact with the associated corner reinforcement 70. Alternatively, the larger head portion 86 can instead butt against the corner reinforcement 70. Thus, either the head portions 84 or 86 may be used as desired in order to provide the proper tensioning of the display film in the carrier and to center it properly within the display opening defined by display face 60.

This same mounting procedure with the fastening members 46 is utilized at least at each of the corners of the carrier and display film such that the display film is under a constant tension and in suspension in the carrier frame between the flanges 64. The constant tension provided by the elastomeric members 46 on the display film adjusts for the different coefficients of expansion and contraction of the display film and carrier frame materials, thus preventing undesired distortion of the display film image in either carrier frame 22 or 40.

It is also to be noted that the flange 64 extends outwardly from the frame 22 and the apertures therein are located so that there is a small gap 88 (see FIG. 4) of about ⅛ inch between the display film 68 and the inner surface 61 of the carrier display face 60. This small gap enables air flow between the display film and the inside carrier surface 61 to inhibit the formation of moisture therebetween. A similar gap 89 is also provided in the carrier frame 40 between display film 38 and the inner surface 43.

It is desired of course that the tensioning member 46 be formed of an elastomeric material to enable the middle portion 80 to stretch under tension and maintain such tension at all of the fastening points with the display film. Under this condition, it is preferred that the member be translucent in order to allow good light transmission which both minimizes the noticeability of the tension fastener when installed in the display and also adds to the overall permanent appearance of the display. In addition, the flange 64 is angled transversely from the display face 60 so that the tensioning members 46 do not appear in the display face but instead are in the border area defined by the side flanges, as can be seen in FIGS. 3 and 4.

It may be noted that the carrier 40 is a complete subassembly including the display film 38 and tensioning members 46, and may also include the channel frame 50 with hinge 52 for mounting to an existing framework structure 12.

Referring now to FIGS. 7 and 8, there is illustrated another embodiment of the invention which includes a display 90 incorporating a supporting frame 92 within which there is mounted a light diffusion panel 94 containing a background image 96. The diffusion panel 94 may be mounted in the display framework in a similar manner as that described in connection with display 10. A hinged door 98 includes a door frame 100 hinged at one end to the frame 92 and within which is mounted a transparent carrier 102 having hanger bars 106 with changeable characters 108 mounted on one face and a display film 110 containing an image 112 suspended by elastomeric tensioning members such as members 46. The display 90 may be a double ended display having another display face on the opposite side of the frame 92. In addition, standard illuminating apparatus can be provided in the frame 92 for illuminating both display faces.

The display 90 is relatively smaller in size as compared to the display 10. However, even in this embodiment a three-in-one display feature with changeability in two of the three displays is provided. As an example of display sizes for the various illustrated embodiments—the removable carrier frame 22 may range in size from about 25 X 37 inches to about 37 X 49 inches, and the carrier frames 40, 102 may range in size from about 28 X 40 inches to about 40 X 52 inches. It is to be understood that these examples are given by way of illustrating various embodiments of the invention, and are not to be taken as any limitation of the scope of the invention since the principles thereof can be readily applied to other display sizes following the teachings herein.

What is claimed is:

1. A removable display film carrier for changeable copyboards comprising:
   a carrier frame having a display face bounded by side flanges extending from said carrier frame transversely to said display face and including means for removably attaching said carrier frame to said copyboard;
   said side flanges having mounting apertures therein;

a thin, flexible film sheet bearing a display image and including a plurality of apertures along the perimeter thereof; and a plurality of tensioning members for suspendingly mounting said film sheet in substantially constant tension on said carrier frame with said display image viewable through said display face;

each of said tensioning members including;

an elongated, elastomeric middle portion, a tail knob at one end of said middle portion, said tail knob having a slightly larger cross sectional portion than said middle portion;

a head knob at the other end of said middle portion, said head knob having a slightly larger cross sectional portion than said middle portion;

each of said tensioning members engageable between respective mounting apertures in said side flanges and said film sheet perimeter with said tail knob engaging said side flange, said head knob engaging said film sheet, and said middle portion in elastic tension therebetween for suspending said film sheet in substantially constant tension between said side flanges.

2. A removable display film carrier as claimed in claim 1, including means for suspending said film sheet in spacial separation from said carrier frame display face to inhibit the collection of moisture therebetween.

3. A removable display film carrier as claimed in claim 1, wherein said film sheet is substantially rectangular, and including, corner reinforcement means at each corner of said film sheet, each of said tensioning members engageable with said film sheet and corner reinforcement means at respective film sheet corners.

4. A removable display film carrier as claimed in claim 1, wherein said side flanges include corner anchor portions intermediate respective adjacent ends of each of said side flanges, said corner anchor portions each including one of said mounting apertures, and wherein said tail knob of each of said tensioning members is engageable with a respective one of said corner anchor portions for suspending said film sheet.

5. A removable display film carrier as claimed in claim 1, including reinforcing means between said display face and said side flanges for reinforcing said carrier frame.

6. A removable display film carrier as claimed in claim 1, said side flanges angled transversely from said display face to define a border area around said display face; and wherein said mounting apertures on said side flanges are located such that said tensioning members extend between said angled side flanges and said film sheet substantially within said border area and are not directly viewable at said display face.

7. A display film carrier assembly for changeable copyboard framework structures comprising:

a transparent carrier panel having a central display face;

a border rim around the perimeter of said display face, including a mounting flange portion extending therefrom;

channel frame means engageable with said mounting flange portion for mounting said carrier panel around the perimeter thereof;

said channel frame means including a hinge for hingedly mounting said channel frame means to said copyboard framework structure;

an image bearing display film; and means for detachably mounting said display film on said carrier panel immediately adjacent and viewable through said central display face, said means including, a plurality of elastomeric fastening members engageable between said display film and the perimeter of said border rim, each including, an elastomeric middle portion;

a tail knob at one end of said middle portion; and a head portion at the other end;

each of said fastening members engageable in fastening position between said display film and said carrier panel, with said head portion disposable on one side of said display film, said tail knob disposable on said border rim; and said middle portion therebetween in elastomeric tension for maintaining said film in substantially constant tension suspension on said carrier panel.

8. A display film carrier assembly as claimed in claim 7, wherein said border rim includes a reinforcing rim portion for reinforcing said carrier panel.

* * * * *